(12) United States Patent
Chang et al.

(10) Patent No.: US 11,561,649 B2
(45) Date of Patent: Jan. 24, 2023

(54) OPERATION JUDGMENT METHOD FOR INTERACTIVE TOUCH SYSTEM

(71) Applicant: Aver Information Inc., New Taipei (TW)

(72) Inventors: Chao-Hung Chang, New Taipei (TW); Chia-Feng Wu, New Taipei (TW); Yun-Long Sie, New Taipei (TW); Cheng-Cheng Yu, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 0 days.

(21) Appl. No.: 17/716,011

(22) Filed: Apr. 8, 2022

(65) Prior Publication Data
US 2022/0334673 A1   Oct. 20, 2022

(30) Foreign Application Priority Data
Apr. 16, 2021   (TW) .................................. 110113711

(51) Int. Cl.
*G06F 3/041*   (2006.01)
*G06F 3/042*   (2006.01)

(52) U.S. Cl.
CPC .......... *G06F 3/0418* (2013.01); *G06F 3/0425* (2013.01)

(58) Field of Classification Search
CPC ............................. G06F 3/0418; G06F 3/0425
See application file for complete search history.

(56) References Cited

U.S. PATENT DOCUMENTS

| | | | | |
|---|---|---|---|---|
| 2014/0356843 A1* | 12/2014 | Yang | ........................ | G09B 5/00 434/362 |
| 2018/0088677 A1* | 3/2018 | Zhang | ................... | G06T 19/006 |
| 2018/0349015 A1* | 12/2018 | Nimri | ................... | G06F 3/0484 |
| 2020/0348900 A1 | 11/2020 | Zhang et al. | | |

* cited by examiner

*Primary Examiner* — Jonathan A Boyd
(74) *Attorney, Agent, or Firm* — McClure, Qualey & Rodack, LLP

(57) ABSTRACT

An operation judgment method for an interactive touch system, which is applied by a first electronic device in cooperation with a second electronic device. The first electronic device receives a projected image from the second electronic device. The projected image is displayed on a display surface of the first electronic device. The operation judgment method includes steps S1 to S3. Step S1 generates a plurality of touch feature information corresponding to a plurality of touchpoints according to a touch action. Each touch feature information includes a plurality of eigenvalues, and the touch feature information is stored in a touch register module, wherein the first touch feature information of each touch action is the initial touchpoint. Step S2 sequentially analyzes the touch feature information to generate a first command or a second command. Step performs a corresponding operation according to the first command or the second command.

9 Claims, 4 Drawing Sheets

OPERATION JUDGMENT METHOD FOR INTERACTIVE TOUCH SYSTEM

CROSS REFERENCE TO RELATED APPLICATIONS

This Non-provisional application claims priority under 35 U.S.C. § 119(a) on Patent Application No. 110113711 filed in Republic of China on Apr. 16, 2021, the entire contents of which are hereby incorporated by reference.

BACKGROUND

1. Technical Field

The present invention relates to a judgment method, in particular to a judgment method for judging an operation object in an interactive touch system.

2. Description of Related Art

In order to enrich the teaching content and enhance the fun and effectiveness of learning, the construction of interactive digital devices in classrooms has become a trend. Common interactive digital devices include interactive flat panels (IFP) and interactive white boards (IWB). The user can control the operating system (OS) of the interactive flat panel through the touch unit to perform operations such as clicking, dragging, zoom in, or zoom out, etc.

In addition, in order to make the teaching content more flexible and diversified, the external digital audio-visual device, such as a notebook computer, a tablet computer, or a mobile phone, etc., can display the screen of the operating system on the interactive flat panel and can use the touch unit of the interactive flat panel to operate the above-mentioned operating system of the external digital audio-visual device. In order to explain the teaching content presented by the external digital audio-visual device in the operating system, users can use the built-in "annotation function" of the interactive flat panel to annotate key passages of the teaching content, making it easier to explain the content of the teaching.

However, in order to avoid confusing the control object with touch commands, when the annotation function of the interactive flat panel is turned on, the user will not be able to operate the external digital audio-visual device through the touch unit and needs to wait for the annotation function to be turned off. After that, the touch unit can operate the external digital audio-visual device. In addition, when the user needs to frequently switch between the two operations of "the annotation function" and "the operation of the external digital audio-visual device", the user need to switch constantly. One of the switching modes requires the user to wave his arms to perform a wide range of touch switching, which is extremely inconvenient to use. Furthermore, the current interactive flat panel is generally matched with a large-size display of 65 inches to 100 inches or more. The larger the touch area, the larger the range of the above-mentioned arm waving to touch, which will be more inconvenient to use.

Therefore, it is one of the important subject matters to solve the above problem so that the user can conveniently perform the required operation without frequent switching.

SUMMARY OF THE INVENTION

In view of the foregoing, an object of the invention is to provide an operation judgment method for an interactive touch system, which can judge the operating system corresponding to the touch action by a user, and then automatically execute the corresponding operation.

To achieve the above, the invention provides an operation judgment method of an interactive touch system, which is applied in cooperation with a first electronic device and a second electronic device. The first electronic device receives a projected image from the second electronic device then the projected image is displayed on a display screen of the first electronic device. The operation judgment method includes the following steps. Step 1 is to generate a plurality of touch feature information corresponding to a plurality of touchpoints according to a touch action, wherein each of the touch feature information includes a plurality of eigenvalues, and the touch feature information is stored in a touch register module, the first touch feature information of each touch action is an initial touchpoint. Step 2 is to analyze the plurality of touch feature information in sequence to generate a first command or a second command. Step 3 is to perform a corresponding operation according to the first command or the second command, wherein the first command is to perform an operation on the first electronic device, and the second command is to perform an operation on the second electronic device.

In one embodiment, the plurality of touch feature information reflect a touchpoint coordinate, a touchpoint area, a touchpoint travel distance, a time difference between multi touchpoints, the distance between multi touchpoints, and any combination thereof of the touch action.

In one embodiment, the eigenvalue includes a touchpoint number, a coordinate, an area, a touch state, a time, and any combination thereof.

In one embodiment, the step of analyzing the touch feature information further includes judging the coordinate of the eigenvalue is in one of the first zone, a second zone, or a third zone of the display screen. The corresponding function of the first electronic device is executed according to the touch action when the coordinate is in the third zone; the corresponding function of the second electronic device is executed according to the touch action when the coordinate is in the second zone; and an annotation function judgment process is executed according to the touch action when the coordinate is in the first zone.

In one embodiment, the annotation function judgment process includes the steps of judging whether the touch feature information is a new touchpoint; judging whether the area eigenvalue of the touch feature information is less than a touchpoint area preset value; and judging whether the touch feature information has the same touchpoint number as the touch feature information stored in an early judgment register module.

In one embodiment, the annotation function judgment process includes the steps of storing the touch feature information into the early judgment register module; comparing the touchpoint travel distance with the same touchpoint number in the plurality of touch feature information stored in the early judgment register module; removing the plurality of touch feature information with the same touchpoint number in the early judgment register module and storing the touch feature information in the post execution register module; and transmitting the touch feature information to the first electronic device.

In one embodiment, the annotation function judgment process also includes the steps of judging whether the touch feature information has a same serial number label as the plurality of touch feature information stored in a post execution register module; and storing the touch feature information in the post execution register module and transmitting the touch feature information to the first electronic device.

In one embodiment, the step of analyzing the touch feature information also includes comparing the distance eigenvalue and the time eigenvalue of the touch feature information with the distance eigenvalue and the time eigenvalue of the touch feature information of the initial touchpoint with different touchpoint numbers stored in an early judgment register module and a post execution register module; and removing the plurality of touch feature information corresponding to the touchpoint number in the early judgment register module and the post execution register module if the distance difference is less than the preset distance difference and the time difference is less than the preset time difference.

In one embodiment, the operation judgment method further includes removing the touch feature information with the same touchpoint number from the touch register module, the early judgment register module, and the post execution register module.

As mentioned above, the operation judgment method of the interactive touch system of the invention utilizes the analysis of the eigenvalue in the touch feature information to determine the meaning represented by the touch action corresponding to the touch feature information, and then controls the first electronic device or controls the second electronic device to execute the corresponding command and action. Therefore, the user no longer needs to switch the operating object and can conveniently use the interactive touch system.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

The following disclosures, with reference to corresponding figures, provide detail descriptions for preferable embodiments of the pairing and interconnecting method for electronic devices in the present invention. Furthermore, reference will be made to the drawings to describe various inventive embodiments of the present disclosure in detail, wherein like numerals refer to like elements throughout.

Figure 1:
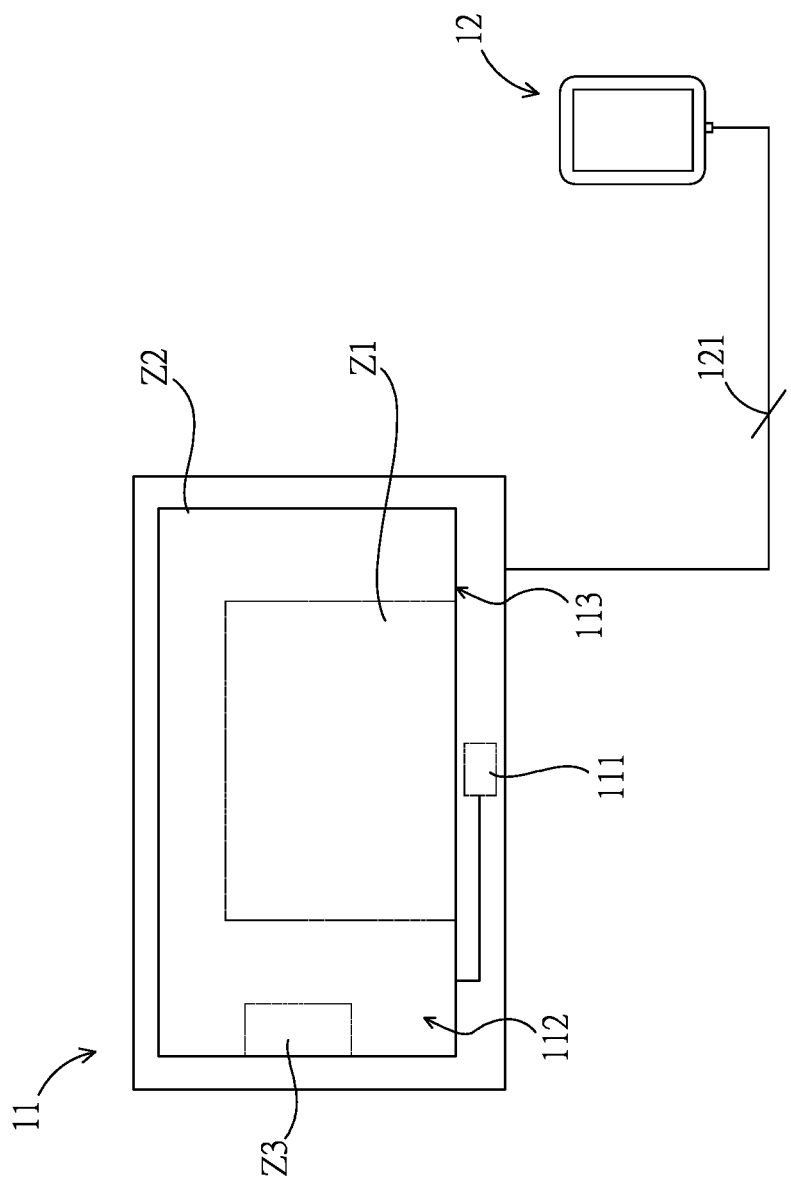
FIG. 1 is a schematic diagram showing the first electronic device and the second electronic device used in conjunction with the operation judgment method of the interactive touch system of the invention.

Please refer to FIG. 1, an operation judgment method of an interactive touch system of the invention is applied in cooperation with a first electronic device 11 and a second electronic device 12. The first electronic device 11 is, for example, an interactive flat display device or an interactive electronic whiteboard, and the second electronic device 12 is an external digital audio-visual device, such as a notebook computer, a desktop computer, a tablet computer, or a mobile phone. In the embodiment, the first electronic device 11 is taken as an example of the interactive flat display device, and the second electronic device 12 is taken as an example of the tablet computer. The following description will refer to the interactive flat display device and the tablet computer with corresponding reference symbols, that is, the interactive flat display device 11 is equivalent to the first electronic device 11 and the tablet computer 12 is equivalent to the second electronic device 12.

The interactive flat display device 11 has at least an audio-visual processing unit 111, a display unit 112, and a touch unit 113. The audio-visual processing unit 111 is equipped with an operating system (OS), such as Android, OS X or Windows, etc., and is connected with the display unit 112 and the touch unit 113. The audio-visual processing unit 111 displays the operating system on the display unit 112, and the user can operate the operating system of the audio-visual processing unit 111 via the touch unit 113, such as clicking, dragging, zoom in, or zoom out, etc. Among them, the touch unit 113 can be a resistive touch unit, a capacitive touch unit, or an optical touch unit.

The interactive flat display device 11 and the tablet computer 12 can be connected by wireless transmission or wired transmission, and accordingly, the tablet computer 12 can transmit a projected image 121 to the interactive flat display device 11. During the display process of the projected image, the user can not only watch, but also operate the projected image by controlling the interactive flat display device 11 or the tablet computer 12, so the user can switch the object to operate. The operation judgment method of the invention mainly lies in that the object to be operated by the touch action of the user can be automatically judged.

To further illustrate, in the embodiment, the operating system screen of the tablet computer 12 is used as the projected image and is displayed on the display unit 112 via the audio-visual processing unit 111 of the interactive flat display device 11 for watching or operating. A user can operate the operating system of the tablet computer 12 through the touch unit 113 of the interactive flat display device 11. In other words, after recognizing the touch action input by the user, the touch unit 113 of the interactive flat display device 11 can convert the touch action into a command to control the interactive flat display device 11 or the tablet computer 12, and then operate the operating system of the interactive flat display device 11 or the operating system of the tablet computer 12. For example, the user can press (or click) a graphic displayed on the display unit 112 of the interactive flat display device 11 to perform a dragging action, and a dragging command can be transmitted to the tablet computer 12 to move the graphics accordingly.

In addition, in the embodiment, the display unit 112 of the interactive flat display device 11 is divided into a first zone Z1, a second zone Z2, and a third zone Z3. Among them, the first zone Z1 is the zone where the annotation function may be executed, and the zone range can be preset by the system or can be customized by the user; the second zone Z2 is the other zone; and the third zone Z3 displays the function selection list or diagram of the interactive flat display device 11, so the third zone Z3 is the system operating zone with the highest weighting factor.

Figure 2A:
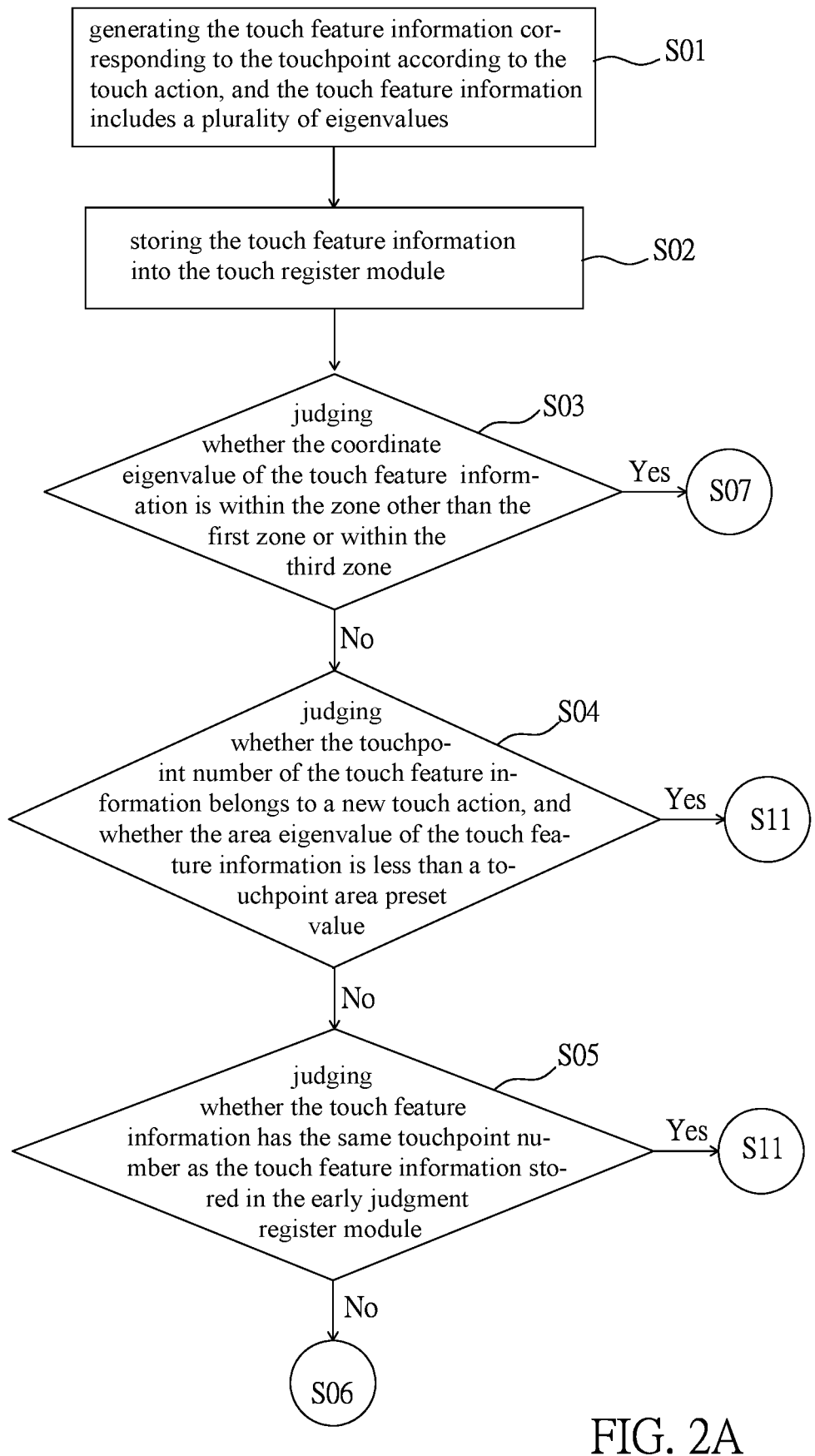
FIG. 2A to FIG. 2C are flowcharts showing the operation judgment method of the interactive touch system of the invention.
Figure 2B:
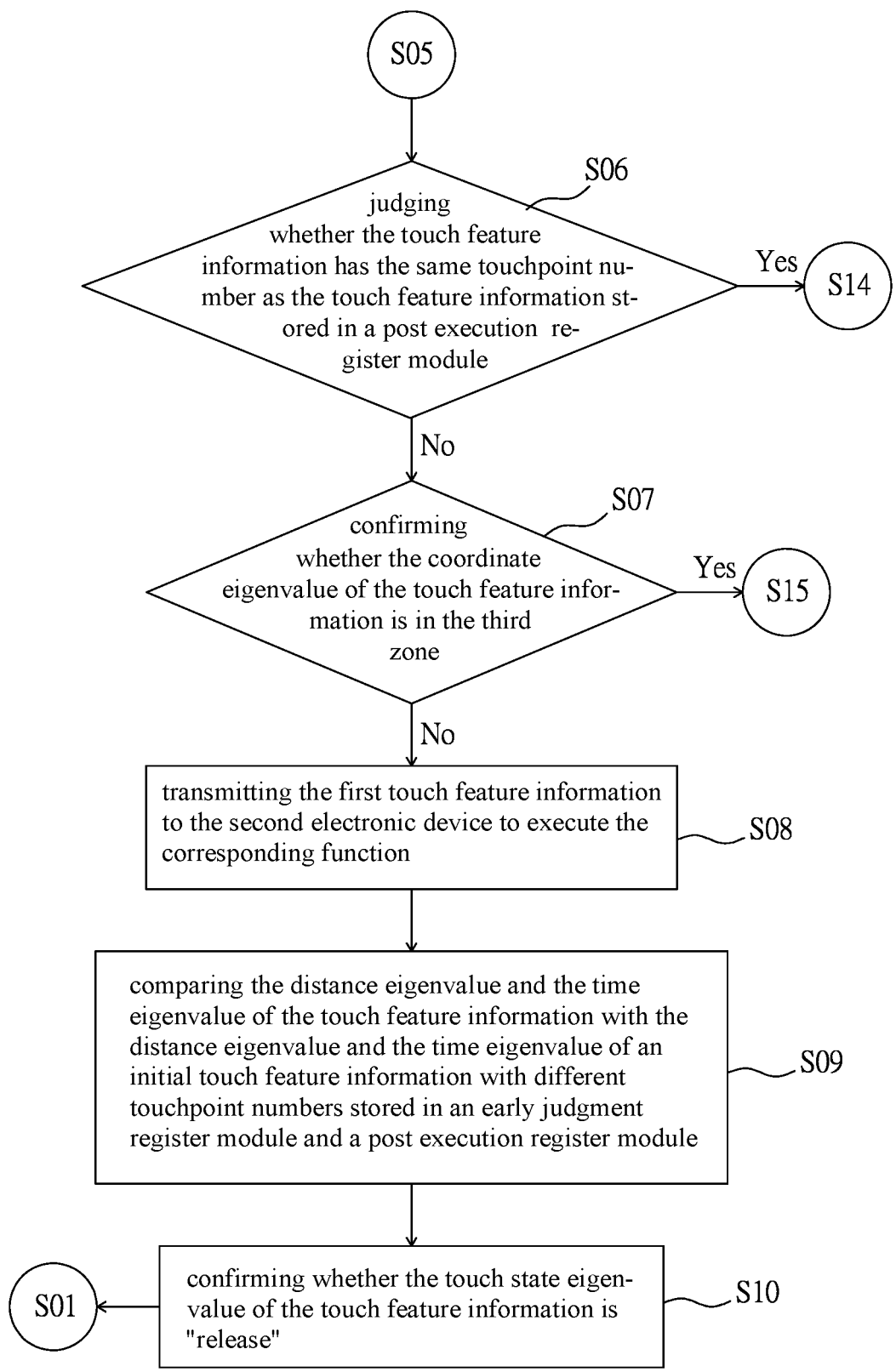
Figure 2C:
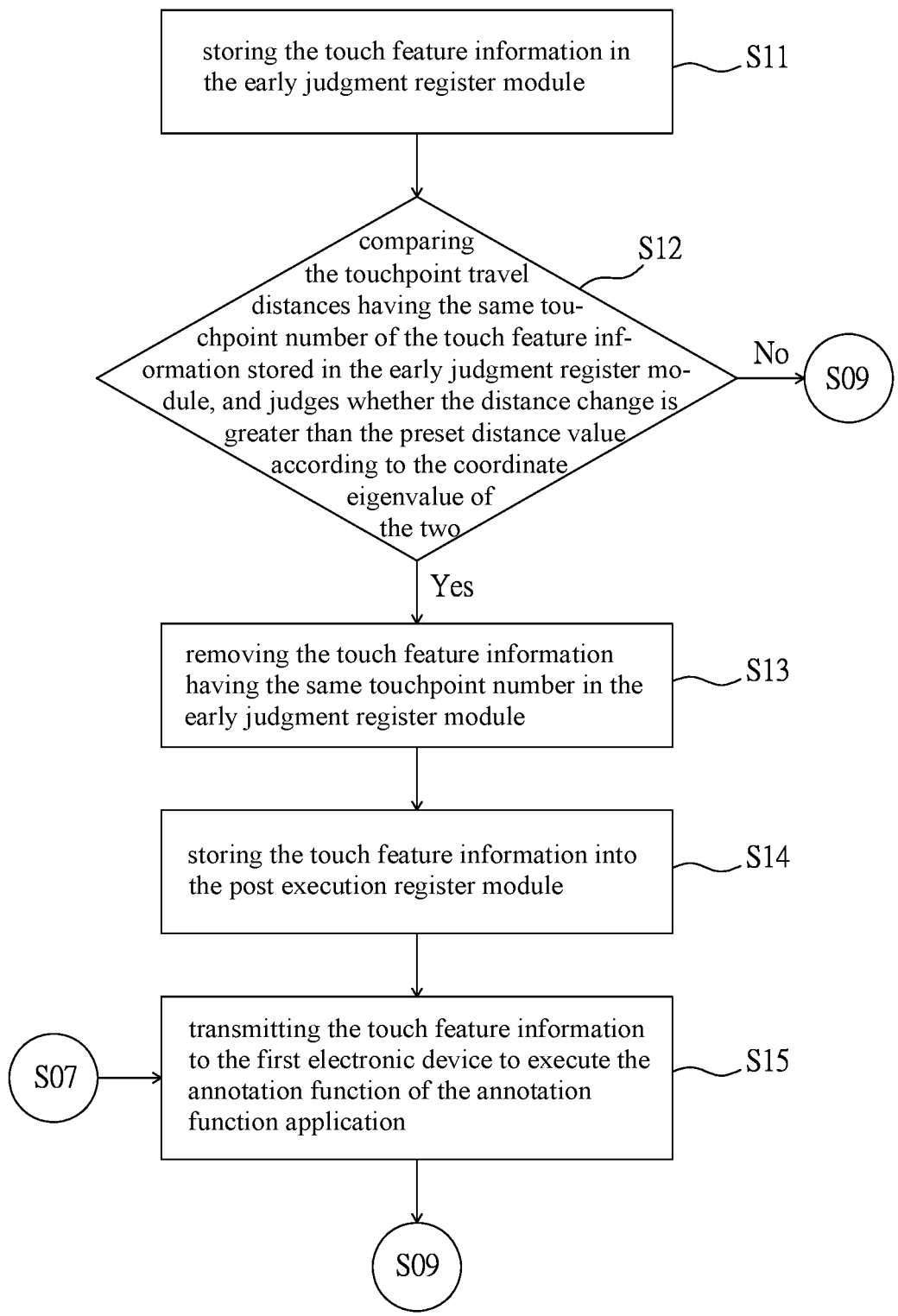

Please refer to FIG. 2A to FIG. 2C to illustrate the operation judgment method of the invention. Before executing the operation judgment method, after the interactive flat display device 11 displays the projected image transmitted from the tablet computer 12, one of the annotation function applications of the interactive flat display device 11 can be enabled. After starting the annotation function application, the operating system of the interactive flat display device 11 will identify the window area opened by the annotation function application, then the operating system of the interactive flat display device 11 sets a canvas with the same size as the window area at the corresponding position of the window area for user input. Wherein, the annotation function application can be, but not limited to, a traditional application program, a mobile APP, or a widget. The operation judgment method includes steps S01 to S14.

Step S01 is to generate a touch feature information corresponding to a touchpoint according to a touch action, and the touch feature information includes a plurality of eigenvalues. The eigenvalues may include a touchpoint number, a coordinate, an area, a touch state, and a time. Further explanation, the touchpoint number represents that the touchpoint belongs to the same touch action or different touch actions; the coordinate represents the coordinate position of the touchpoint on the display unit 112 (or the touch unit 113); the area represents the area occupied by the touchpoint on the display unit 112; the touch state represents that the user presses the display unit 112 or releases the touch from the display unit 112; and the time represents the time the user keeps pressing on the display unit 112.

Step S02 is to store the touch feature information into a touch register module.

Step S03 is to judge whether the coordinate eigenvalue of the touch feature information is within a zone other than the first zone Z1 or whether it is within the third zone Z3. Step S07 is executed if the judgment result is "Yes", and step S04 is executed if the judgment result is "No".

Step S04 is to judge whether the touchpoint number of the touch feature information belongs to a new touch action, and to judge whether the area eigenvalue of the touch feature information is less than a touchpoint area preset value. Step S11 is executed if the judgment result is "Yes", and step S05 is executed if the judgment result is "No".

Step S05 is to judge whether the touch feature information has the same touchpoint number as the touch feature information stored in an early judgment register module. Step S11 is executed if the judgment result is "Yes", and step S06 is executed if the judgment result is "No".

Step S06 is to judge whether the touch feature information has the same touchpoint number as the touch feature information stored in a post execution register module. Step S14 is executed if the judgment result is "Yes", and step S07 is executed if the judgment result is "No".

Step S07 is to confirm whether the coordinate eigenvalue of the touch feature information is in the third zone Z3. Step S15 is executed if the confirmation result is "Yes", then the touch feature information is transmitted to the interactive flat display device 11 to execute the corresponding function. Step S08 is executed if the confirmation result is "No", then the touch feature information is transmitted to the tablet computer 12 to execute the corresponding function, and step S09 is then be executed. In the embodiment, since the third zone Z3 is the system operation zone with the highest weight factor, the touch action on this zone will be directly transmitted to the interactive flat display device 11 to execute the corresponding function.

Step S09 is to compare the distance eigenvalue and the time eigenvalue of the touch feature information with the distance eigenvalue and the time eigenvalue of an initial touch feature information with different touchpoint numbers stored in an early judgment register module and a post execution register module. If the distance difference is less than the preset distance difference and the time difference is less than the preset time difference result the plurality of touch feature information corresponding to the touchpoint number in the early judgment register module and the post execution register module is removed, and next, step S10 is executed. Here, the so-called the initial touch feature information refers to the touch feature information that has the different touchpoint numbers and is first stored in the early judgment register module or the post execution register module.

Step S10 is to confirm whether the touch state eigenvalue of the touch feature information is "release". If the confirmation result is "Yes", thus the touch feature information with the same touchpoint number in the touch register module, the early judgment register module, and the post execution register module is removed, and next, step S01 is executed.

If the judgment result of the above steps S04 and S05 is "Yes", step S11 will be executed, and step S11 is to store the touch feature information in the early judgment register module, and step S12 is then be executed.

Step S12 is to compare the touchpoint travel distances having the same touchpoint number of the touch feature information stored in the early judgment register module. It extracts the initial touch feature information and the latest (or current) touch feature information having the same touchpoint number, and judges whether the distance change is greater than the preset distance value according to the coordinate eigenvalue of the two. Step S13 is executed if the judgment result is "Yes", and step S09 is executed if the judgment result is "No".

Step S13 is to remove the touch feature information having the same touchpoint number in the early judgment register module, and step S14 is then be executed.

Step S14 is to store the touch feature information into the post execution register module, and step S15 is then be executed.

Step S15 is to transmit the touch feature information to the interactive flat display device 11 to execute the annotation function of the annotation function application. Next, step S09 is executed.

The following six embodiments are used to illustrate the operation judgment method of the interactive touch system of the invention. In the first to fifth embodiments, the parameters of the operation judgment method are as follows: the touch resolution is 1600×900, the third zone Z3 is located within the range of the coordinates (0,360) and (150,500), the first zone Z1 is located within the range of the coordinates (400,225) and (1200,900), the second zone Z2 is located outside the first zone Z1 and the third zone Z3, the touchpoint area preset value is 10, the distance between multi touchpoints preset value is 10, the time difference between multi touchpoints preset value is T5, and the touchpoint travel distance preset value is 10.

The First Embodiment

The touch action in this embodiment is that the user touches the touch unit 113 at the coordinate (10,10) and drags it to the coordinate (10,20), and then releases the touch. Please refer to FIG. 1 and the flowcharts of FIGS. 2A to 2C to illustrate the operation judgment method of this embodiment.

Step S01 is to generate the first touch feature information according to the first touchpoint of the touch action, and the content of the first touch feature information includes five eigenvalues [touchpoint number; coordinate eigenvalue; area eigenvalue; touch state; time eigenvalue] are [ID1; (10,10); 10; press; T1]. Step S02 is to store the first touch feature information [ID1; (10,10); 10; press; T1] in the touch register module. Here, the first touch feature information [ID1; (10,10); 10; press; T1] represents the initial touch feature information of the touch action.

The judgment result of step S03 for the zone where the touchpoint is located is "Yes", so step S07 is then be executed. In this embodiment, the coordinate eigenvalue (10, 10) shows that the first touchpoint is located in the second zone Z2, which means that the first touchpoint is not within the zone of the first zone Z1 or the third zone Z3.

Since the first touchpoint is not within the range of the third zone Z3, the confirmation result of step S07 is "No", so step S08 is then be executed to transmit the first touch feature information [ID1; (10,10); 10; press; T1] to the tablet computer 12 to execute the function of the corresponding command, and step S09 is then be executed. Since neither the touch feature information is stored in the early judgment register module nor the post execution register module, therefore, step S10 is executed after step S09 is completed. Step S10 confirms that the touch state is not equal to "release", so it will return to step S01 to perform the second touchpoint detection.

Next, step S01 is to generate the second touch feature information [ID1; (10,20); 10; release; T2] according to the second touchpoint. Step S02 is to store the second touch feature information [ID1; (10,20); 10; release; T2] into the touch register module. Among them, the second touch feature information [ID1; (10,20); 10; release; T2] represents the latest (or current) the touch feature information of the touch action. In addition, the current touch register module stores two pieces of the touch feature information, namely [ID1; (10,10); 10; press; T1] and [ID1; (10,20); 10; release; T2].

The judgment result of step S03 for the zone where the touchpoint is located is "Yes", so step S07 is then be executed. In this embodiment, the coordinate eigenvalue (10,20) shows that the second touchpoint is located in the second zone Z2, which means that the second touchpoint is not within the zone of the first zone Z1 or the third zone Z3.

Since the second touchpoint is not within the range of the third zone Z3, the confirmation result of step S07 is "No", so step S08 is then be executed to transmit the second touch feature information [ID1; (10,20); 10; release; T2] to the tablet computer 12 to execute the function of the corresponding command, and step S09 is then be executed. Since neither the touch feature information is stored in the early judgment register module nor the post execution register module, therefore, step S10 is executed after step S09 is completed. Step S10 confirms that the touch state is equal to "release", so the touch feature information having the touchpoint number of [ID1] in the touch register module, the early judgment register module, and the post execution register module will be removed.

The second embodiment.

The touch action in this embodiment is that the user touches the touch unit 113 at the coordinate (10, 450) and drags it to the coordinate (10, 460), and then releases the touch. Please refer to FIG. 1 and the flowcharts of FIGS. 2A to 2C to illustrate the operation judgment method of this embodiment.

Step S01 is to generate the first touch feature information [ID1; (10,450); 10; press; T1] according to the first touchpoint of the touch action. Step S02 is to store the first touch feature information [ID1; (10,450); 10; press; T1] in the touch register module. The judgment result of step S03 for the zone where the touchpoint is located is "Yes", so step S07 is then be executed. In this embodiment, the coordinate eigenvalue (10,450) shows that the first touchpoint is located at the third zone Z3.

Since the first touchpoint is within the range of the third zone Z3, the confirmation result of step S07 is "Yes", so step S15 is then be executed to transmit the first touch feature information [ID1; (10, 450); 10; press; T1] to the interactive flat display device 11 to execute the function of the corresponding command, and step S09 is then be executed. Since neither the touch feature information is stored in the early judgment register module nor the post execution register module, therefore, step S10 is executed after step S09 is completed. Step S10 confirms that the touch state is not equal to "release", so it will return to step S01 to perform the second touchpoint detection.

Next, step S01 is to generate the second touch feature information [ID1; (10, 460); 10; release; T2] according to the second touchpoint. Step S02 is to store the second touch feature information [ID1; (10, 460); 10; release; T2] into the touch register module.

The judgment result of step S03 for the zone where the touchpoint is located is "Yes", so step S07 is then be executed. In this embodiment, the coordinate eigenvalue (10,460) shows that the second touchpoint is located in the third zone Z3, so the confirmation result of step S07 is "Yes", so step S15 is then be executed to transmit the second touch feature information [ID1; (10,460); 10; release; T2] to the interactive flat display device 11 to execute the function of the corresponding command, and step S09 is then be executed. Since neither the touch feature information is stored in the early judgment register module nor the post execution register module, therefore, step S10 is executed after step S09 is completed. Step S10 confirms that the touch state is equal to "release", so the touch feature information having the touchpoint number of [ID1] in the touch register module, the early judgment register module, and the post execution register module will be removed.

The Third Embodiment

The touch action in this embodiment is that the user touches the touch unit 113 at the coordinate (800,450) and drags it to the coordinate (850,450), and then releases the touch. Please refer to FIG. 1 and the flowcharts of FIGS. 2A to 2C to illustrate the operation judgment method of this embodiment.

Step S01 is to generate the first touch feature information [ID1; (800,450); 100; press; T1] according to the first touchpoint of the touch action. Step S02 is to store the first touch feature information [ID1; (800,450); 100; press; T1] in the touch register module. Since the coordinate eigenvalue is in the first zone Z1, the judgment result of step S03 for the touchpoint area is "No", so step S04 is then be executed.

Since the area eigenvalue [100] in the first touch feature information is greater than the area preset value [10], the judgement result of step S04 is "No", and step S05 is then be executed. Since no touch feature information is stored in the early judgment register module, the judgment result of step S05 is "No", and step S06 is then be executed. Since no touch feature information is stored in the post execution register module, the judgement result of step S06 is "No", and step S07 is then be executed.

Since the coordinate eigenvalue (800,450) is within the first zone Z1, the confirmation result of step S07 is "No", step S08 is then be executed to transmit the first touch feature information [ID1; (800,450); 100; press; T1] to the tablet computer 12 to execute the function of the corresponding command, and step S09 is then be executed. Since neither the touch feature information is stored in the early judgment register module nor the post execution register module, therefore, step S10 is executed after step S09 is completed. Step S10 confirms that the touch state is not equal to "release", so it will return to step S01 to perform the second touchpoint detection.

Next, step S01 is to generate the second touch feature information [ID1; (850,450); 5; press; T2] according to the second touchpoint. Step S02 is to store the second touch feature information [ID1; (850,450); 5; press; T2] in the touch register module. Since the coordinate eigenvalue is within the first zone Z1, the judgment result of step S03 for the zone where the touchpoint zone is located is "No", and step S04 is then be executed.

Although the area eigenvalue [5] in the second touch feature information is smaller than the area default value [10], because the touchpoint number [ID1], however, in the second touch feature information is not the newly added in the touch register module touchpoint number, so the judgment result of step S04 is "No", and step S05 is then be executed.

Since there is no touch feature information stored in the early judgment register module, the judgment result of step S05 is "No", and step S06 is then be executed. Then, since there is no touch feature information stored in the post execution register module, the judgement result of step S06 is "No", and step S07 is then be executed.

Since the coordinate eigenvalue (850,450) is within the first zone Z1, the confirmation result of step S07 is "No", so step S08 is then be executed to transmit the second touch feature information [ID1; (850,450); 5; press; T2] to the tablet computer 12 to execute the function of the corresponding command, and step S09 is then be executed. Since neither the touch feature information is stored in the early judgment register module nor the post execution register module, therefore, step S10 is executed after step S09 is completed. Step S10 confirms that the touch state is not equal to "release", so it will return to step S01 to perform the touchpoint detection.

The Fourth Embodiment

The touch action in this embodiment is that the user touches the touch unit 113 at the coordinate (800,450) to generate the first touchpoint, drags it to the coordinate (805,450) to generate the second touchpoint, and then drags it to the coordinate (813,450) to generate the third touchpoint, and then drag to the coordinate (820,450) to generate the fourth touchpoint. Please refer to FIG. 1 and the flowcharts of FIGS. 2A to 2C to illustrate the operation judgment method of this embodiment.

Step S01 is to generate the first touch feature information [ID1; (800, 450); 5; press; T1] according to the first touchpoint of the touch action. Step S02 is to store the first touch feature information [ID1; (800,450); 5; press; T1] into the touch register module. Since the coordinate eigenvalue [(800,450)] is within the first zone Z1, the judgment result of step S03 for the zone where the touchpoint is located is "No", so step S04 is then be executed.

Since the touchpoint number [ID1] of the first touch feature information is the touchpoint number newly added in the touch register module, and the area eigenvalue [5] is smaller than the area default value [10], thus the judgment result of step S04 is "Yes", and step S11 is then be executed to store the first touch feature information [ID1; (800, 450); 5; press; T1] into the early judgment register module, and step S12 is then be executed.

Since only the first touch feature information is stored in the early judgment register module and there is no change in the touchpoint travel distance, the comparison result in step S12 is "No", and step S09 is then be executed. Since the touch feature information with different touchpoint numbers does not exist in the early judgment register module and the post execution register module, therefore, step S10 is executed after step S09 is completed. Step S10 is to confirm that the touch state is not equal to "release", so it will return to step S01 to perform the second touchpoint detection.

Next, step S01 is to generate the second touch feature information [ID1; (805,450); 5; press; T2] according to the second touchpoint. Step S02 is to store the second touch feature information [ID1; (805,450); 5; press; T2] into the touch register module. Since the coordinate eigenvalue is within the first zone Z1, the judgment result of step S03 for the zone where the touchpoint is located is "No", so step S04 is then be executed.

Although the area eigenvalue [5] of the second touch feature information is smaller than the area preset value [10], however, the touchpoint number [ID1] of the second touch feature information is not the touchpoint number newly added in the touch register module, therefore, the judgment result of step S04 is "No" and step S05 is then be executed.

Since the touchpoint number [ID1] of the second touch feature information is the same as the touchpoint number [ID1] of the first touch feature information stored in the early judgment register module, therefore, the judgment result of step S05 is "Yes", thus step S11 is then be executed to store the second touch feature information into the early judgment register module, and step S12 is then be executed.

In step S12, the touchpoint travel distance is [5] that is obtained according to the coordinate eigenvalue [(800,450)] of the first touch feature information and the coordinate eigenvalue [(805,450)] of the second touch feature information stored in the early judgment register module. The touchpoint travel distance [5] is less than the touchpoint travel distance preset value [10], so the comparison result of step S12 is "No", and step S09 is then be executed. Since the touch feature information with different touchpoint numbers does not exist in the early judgment register module and the post execution register module, step S10 is executed after step S09 is completed. Step S10 confirms that the touch state is not equal to "release", so it will return to step S01 to perform the third touchpoint detection.

Next, step S01 is to generate the third touch feature information [ID1; (813,450); 5; press; T3] according to the third touchpoint. Step S02 is to store the third touch feature information [ID1; (813,450); 5; press; T3] into the touch register module. Since the coordinate eigenvalue is within the first zone Z1, the judgment result of step S03 for the zone where the touchpoint is located is "No", so step S04 is then be executed.

Although the area eigenvalue [5] of the third touch feature information is smaller than the area preset value [10], however, since the touchpoint number [ID1] of the third touch feature information is not the touchpoint number newly added in the touch register module, therefore, the judgment result of step S04 is "No", and step S05 is then be executed.

Since the touchpoint number [ID1] of the third touch feature information is the same as the touchpoint number [ID1] of the first touch feature information and the second touch feature information stored in the early judgment register module, so the judgment result of step S05 is "Yes", and step S11 is then be executed to store the third touch feature information [ID1; (813, 450); 5; press; T3] into the early judgment register module, and step S12 is then be executed.

In step S12, the touchpoint travel distance is [13] that is obtained according to the coordinate eigenvalue [(800,450)] of the first touch feature information and the coordinate eigenvalue [(813,450)] of the third touch feature information stored in the early judgment register module. The touchpoint travel distance [13] is greater than the touchpoint travel distance preset value [10], so the comparison result of step S12 is "Yes", and step S13 is then be executed.

Step S13 is to remove the first touch feature information, the second touch feature information, and the third touch feature information having the same touchpoint number [ID1] in the early judgment register module. Next, step S14 is executed to store the third touch feature information [ID1; (813,450); 5; press; T3] into the post execution register module. Next, step S15 is executed to transmit the third touch feature information to the interactive flat display device 11 to execute the annotation function of the annotation function application, and step S09 is then be executed.

Since the touch feature information with different touchpoint numbers does not exist in the early judgment register module and the post execution register module, step S10 is executed after step S09 is completed. Step S10 confirms that the touch state is not equal to "release", so it will return to step S01 to perform the fourth touchpoint detection.

Next, step S01 is to generate the fourth touch feature information [ID1; (820,450); 5; press; T4] according to the fourth touchpoint. Step S02 is to store the fourth touch feature information [ID1; (820,450); 5; press; T4] into the touch register module. Since the coordinate eigenvalue is within the first zone Z1, the judgment result of step S03 for the zone where the touchpoint is located is "No", so step S04 is then be executed.

Although the area eigenvalue [5] of the fourth touch feature information is smaller than the area preset value [10], however, since the touchpoint number [ID1] of the fourth touch feature information is not the touchpoint number newly added in the touch register module, therefore, the judgment result of step S04 is "No", and step S05 is then be executed.

Since the touch feature information that is the same as the touchpoint number [ID1] of the fourth touch feature information is not stored in the early judgment register module thus the judgment result of step S05 is "No" and step S06 is then be executed.

Since the third touch feature information [ID1; (813,450); 5; press; T3] stored in the post execution register module and the fourth touch feature information [ID1; (820,450); 5; press; T4] have the same touchpoint number [ID1], so the judgment result of step S06 is "Yes", and step S14 is then be executed.

Step S14 is to store the fourth touch feature information [ID1; (820,450); 5; press; T4] into the post execution register module, and step S15 is then be executed.

Step S15 is to transmit the fourth touch feature information to the interactive flat display device 11 to execute the annotation function of the annotation function application. Next, step S09 is executed.

Since the early judgment register module and the post execution register module do not store the touch feature information with different touchpoint numbers, therefore, step S10 is executed after step S09 is completed. Step S10 confirms that the touch state is not equal to "release", so it will return to step S01 to perform the touchpoint detection.

The Fifth Embodiment

The touch action in this embodiment is that the interactive flat display device 11 has executed the annotation function of the annotation function application. Among them, the touch register module stores the third touch feature information [ID1; (813,450); 5; press; T3] and the fourth touch feature information[ID1; (825,450); 5; press; T4], the early judgment register module does not store the touch feature information, and the post execution register module stores the third touch feature information [ID1; (813,450); 5; press; T3] and the fourth touch feature information [ID1; (825, 450); 5; press; T4]. Then, the user adds a fifth touchpoint at the coordinate (815,450) on the interactive flat display device 11. Please refer to FIG. 1 and the flowcharts of FIGS. 2A to 2C to illustrate the operation judgment method of this embodiment.

Step S01 is to generate the fifth touch feature information [ID2; (815,450); 5; press; T5] according to the fifth touchpoint of the touch action. Step S02 is to store the fifth touch feature information [ID2; (815,450); 5; press; T5] into the touch register module. Since the coordinate eigenvalue [(815,450)] is within the first zone Z1, the judgment result of step S03 for the zone where the touchpoint is located is "No", so step S04 is then be executed.

Since the touchpoint number [ID2] of the fifth touch feature information is the touchpoint number newly added in the touch register module, and the area eigenvalue [5] is smaller than the area preset value [10], therefore, the judgment result of step S04 is "Yes", step S11 is then be executed to store the fifth touch feature information into the early judgment register module, and step S12 is then be executed. Moreover, since only the fifth touch feature information is stored in the early judgment register module, there is no change in the touchpoint travel distance, the comparison result in step S12 is "No", and step S09 is then be executed.

Step S09 is to compare the fifth touch feature information [ID2; (815,450); 5; press; T5] with the coordinate eigenvalue of the third touch feature information [ID1; (813,450); 5; press; T3] stored in the post execution register module to obtain the distance between multi touchpoints [2] is less than the distance between multi touchpoints preset value [10] and the time difference between multi touchpoints [T2] is less than the time difference between multi touchpoints preset value [T5]. Therefore, the touch feature information corresponding to the touchpoint number [ID1] and [ID2] in the early judgment register module and the post execution register module is removed and the executed the annotation function that has been executed by the touchpoint number [ID1] is then be removed. Next, step S10 is executed.

Step S10 is to confirm that the touch state is not equal to "release", so it will return to step S01 to continue executing the touchpoint detection.

In the sixth embodiment, the parameters of the operation judgment method are as follows: the touch resolution is 1600×900, the third zone Z3 is located in the range of the coordinates (0,360) and (150,500), the first zone Z1 is located in the range of the coordinates (100,225) and (1200, 900), the second zone Z2 is located in the zone other than the first zone Z1 and the third zone Z3, the touchpoint area preset value is 10, the distance between multi touchpoints preset value is 10, the time difference between multi touchpoints preset values are T5, and the touchpoint travel distance preset value is 10.

The touch action of the sixth embodiment is that the user touches the touch unit 113 at the coordinate (125, 450). Please refer to FIG. 1 and the flowcharts of FIGS. 2A to 2C to illustrate the operation judgment method of this embodiment.

Step S01 is to generate the first touch feature information [ID1; (125, 450); 5; press; T1] according to the first touchpoint of the touch action. Step S02 is to store the first touch feature information [ID1; (125,450); 5; press; T1] into the touch register module.

Since the first touchpoint is within the third zone Z3, the judgment result of step S03 for the zone where the touchpoint is located is "Yes", so step S07 is then be executed. In the embodiment, the coordinate eigenvalue (125,450) shows that the touchpoint is located in the overlapping zone of the first zone Z1 and the third zone Z3. Since the weight factor of the third zone Z3 is higher than the weight factor of the first zone Z1, thus the judgment of the third zone Z3 is given priority.

Since the first touchpoint is within the third zone Z3, the confirmation result of step S07 is "Yes", so step S5 is then be executed to transmit the touch feature information [ID1; (125, 450); 5; press; T1] to the interactive flat display device 11 to execute the function of the corresponding command, and step S09 is then be executed. Since neither the touch feature information is stored in the early judgment register module nor the post execution register module, therefore, step S10 is executed after step S09 is completed. Step S10 confirms that the touch state is not equal to "release", so it will return to step S01 to perform the touchpoint detection.

It should be noted that the touch unit 113 mentioned above is disposed in the interactive flat display device 11, and the touch feature information detected by the touch unit 113 can be analyzed by a computing unit of the interactive flat display device (the first electronic device) 11. However, in other embodiments, the touch feature information can also be analyzed and calculated by the tablet computer (the second electronic device) 12, which is not limited herein. Furthermore, the touch feature information can also be delivered to a third electronic device for analysis and operation, and then respectively control the action of the first electronic device or the second electronic device. The analysis operation of the third electronic device mentioned above may also include cloud computing.

In summary, the operation judgment method of the interactive touch system of the invention utilizes to analyze the eigenvalue in the touch feature information, and utilize the touch feature information stored in the touch register module, the early judgment register module, and the post execution register module to cooperate with a specific logic judgment process to judge the meaning represented by the touch action of the user, and then control the first electronic device or control the action of the second electronic device to execute the corresponding command. Therefore, the user no longer needs to switch the operation object, but can conveniently use the interactive touch system.

The foregoing descriptions for all embodiment as disclosed are merely for exemplary and explanatory purposes but are not intended to limit or depart from the scope and spirit of the present invention. Any change or modification to the foregoing descriptions and embodiments which still maintain their equivalents, should all be enclosed or covered by the scope of the appended claims.

What is claimed is:

1. An operation judgment method of an interactive touch system, which is applied in cooperation with a first electronic device and a second electronic device, wherein the first electronic device receives a projected image from the second electronic device then the projected image is displayed on a display screen of the first electronic device, comprising:
    generating a plurality of touch feature information corresponding to a plurality of touchpoints according to a touch action, wherein each of the touch feature information includes a plurality of eigenvalues and the first touch feature information of each touch action is an initial touchpoint;
    storing the plurality of touch feature information into a touch register module;
    analyzing the plurality of touch feature information in sequence to generate a first command or a second command; and
    executing a corresponding operation according to the first command or the second command, wherein the first command is to execute a first operation on the first electronic device and the second command is to execution a second operation on the second electronic device;
    wherein the plurality of touch feature information reflect a touchpoint coordinate, a touchpoint area, a touchpoint travel distance, a time difference between multi touchpoints, the distance between multi touchpoints, and any combination thereof of the touch action;
    wherein the eigenvalue includes a touchpoint number, a coordinate, an area, a touch state, a time, and any combination thereof, wherein the touchpoint number indicates a particular touch action that the touchpoint is associated with;
    wherein the step of analyzing the touch feature information further comprises judging the coordinate of the eigenvalue is in one of a zone of the display screen.

2. The operation judgment method of claim 1, wherein the zone of the display screen includes a first zone, a second zone;
    wherein the corresponding function of the first electronic device is executed according to the touch action when the coordinate is in the third zone;
    wherein the corresponding function of the second electronic device is executed according to the touch action when the coordinate is in the second zone; and
    wherein an annotation function judgment process is executed according to the touch action when the coordinate is in the first zone.

3. The operation judgment method of claim 2, wherein the annotation function judgment process, further comprising:
    judging whether the touch feature information is a touchpoint newly added; and
    judging whether the area eigenvalue of the touch feature information is less than a touchpoint area preset value.

4. The operation judgment method of claim 3, wherein the annotation function judgment process, further comprising:
    judging whether the touch feature information has the same touchpoint number as the touch feature information stored in an early judgment register module.

5. The operation judgment method of claim 3, wherein the annotation function judgment process, further comprising:
    storing the touch feature information into an early judgment register module;
    comparing the touchpoint travel distance with the same touchpoint number in the plurality of touch feature information stored in the early judgment register module;
    removing the plurality of touch feature information with the same touchpoint number in the early judgment register module;

storing the touch feature information in a post execution register module; and transmitting the touch feature information to the first electronic device.

6. The operation judgment method of claim 4, wherein the annotation function judgment process, further comprising:

storing the touch feature information into the early judgment register module;

comparing the touchpoint travel distance with the same touchpoint number in the plurality of touch feature information stored in the early judgment register module;

removing the plurality of touch feature information with the same touchpoint number in the early judgment register module;

storing the touch feature information in a post execution register module; and transmitting the touch feature information to the first electronic device.

7. The operation judgment method of claim 4, wherein the annotation function judgment process, further comprising:

judging whether the touch feature information has a same touchpoint number as the plurality of touch feature information stored in a post execution register module;

storing the touch feature information in the post execution register module; and transmitting the touch feature information to the first electronic device.

8. The operation judgment method of claim 1, wherein the step of analyzing the touch feature information, further comprising:

comparing the distance eigenvalue and the time eigenvalue of the touch feature information with the distance eigenvalue and the time eigenvalue of the touch feature information of the initial touchpoint with different touchpoint numbers stored in an early judgment register module and a post execution register module; and removing the plurality of touch feature information corresponding to the touchpoint number in the early judgment register module and the post execution register module if the distance difference is less than a preset distance difference and the time difference is less than a preset time difference.

9. The operation judgment method of claim 1, further comprising:

removing the touch feature information with the same touchpoint number from the touch register module, an early judgment register module, and a post execution register module.

\* \* \* \* \*